(12) United States Patent
Park et al.

(10) Patent No.: US 10,802,643 B2
(45) Date of Patent: Oct. 13, 2020

(54) METHOD AND ELECTRONIC DEVICE FOR DETECTING FINGERPRINT

(71) Applicant: Samsung Electronics Co., Ltd., Suwon-si, Gyeonggi-do (KR)

(72) Inventors: Jae Hyung Park, Suwon-si (KR); Seung Geol Baek, Suwon-si (KR); Chi Hyun Cho, Yongin-si (KR); Moon Soo Kim, Seoul (KR); Yun Jang Jin, Yongin-si (KR); Ho Chul Hwang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/921,094

(22) Filed: Mar. 14, 2018

(65) Prior Publication Data
US 2018/0267666 A1 Sep. 20, 2018

(30) Foreign Application Priority Data

Mar. 14, 2017 (KR) .................. 10-2017-0031619

(51) Int. Cl.
*G06F 3/041* (2006.01)
*G06K 9/00* (2006.01)
*G06F 3/044* (2006.01)

(52) U.S. Cl.
CPC .......... *G06F 3/0416* (2013.01); *G06F 3/044* (2013.01); *G06F 3/0412* (2013.01); *G06K 9/0002* (2013.01); *G06K 9/00087* (2013.01)

(58) Field of Classification Search
CPC ...... G06F 3/0412; G06F 3/0416; G06F 3/044; G06K 9/0002; G06K 9/00087
See application file for complete search history.

(56) References Cited

U.S. PATENT DOCUMENTS

| | | | |
|---|---|---|---|
| 9,030,421 B2 | 5/2015 | Tseng et al. | |
| 9,773,148 B2 | 9/2017 | Mo et al. | |
| 9,817,108 B2 | 11/2017 | Kuo et al. | |
| 9,990,089 B2 | 6/2018 | Dickinson et al. | |
| 2012/0249449 A1 | 10/2012 | Tseng et al. | |
| 2015/0015515 A1 | 1/2015 | Dickinson et al. | |
| 2015/0016223 A1 | 1/2015 | Dickinson et al. | |
| 2015/0198699 A1 | 7/2015 | Kuo et al. | |
| 2015/0254491 A1* | 9/2015 | Mo .............. | G06F 3/0416 345/174 |
| 2017/0024597 A1* | 1/2017 | Cho .............. | G06F 21/32 |
| 2017/0123555 A1* | 5/2017 | Kim .............. | G06F 3/0412 |

(Continued)

FOREIGN PATENT DOCUMENTS

KR 10-2016-0033330 A 3/2016
WO 2015/009762 A1 1/2015

*Primary Examiner* — Dmitry Bolotin
(74) *Attorney, Agent, or Firm* — Jefferson IP Law, LLP

(57) ABSTRACT

An electronic device is provided. The electronic device includes a display including a touch sensor and a display panel, a fingerprint sensor included in the display or disposed on a rear surface of the display, and at least one processor electrically connected with the display and the fingerprint sensor. The at least one processor controls an operation of the touch sensor or lowers a frequency of an operating signal of the touch sensor in response to a specified event, activates the fingerprint sensor, and captures a fingerprint image from the fingerprint sensor.

16 Claims, 12 Drawing Sheets

(56) References Cited

U.S. PATENT DOCUMENTS

| | | | |
|---|---|---|---|
| 2017/0153743 A1* | 6/2017 | Kim | G02B 6/0036 |
| 2017/0336906 A1* | 11/2017 | Yoon | G06F 3/0416 |
| 2018/0031686 A1 | 2/2018 | Kuo et al. | |
| 2018/0089491 A1* | 3/2018 | Kim | G06F 3/0412 |
| 2018/0113548 A1* | 4/2018 | Lee | G06F 3/0412 |
| 2018/0114047 A1* | 4/2018 | Kim | G06F 3/0412 |
| 2018/0129798 A1* | 5/2018 | He | G06K 9/00013 |
| 2018/0165533 A1* | 6/2018 | Cho | G06F 3/0412 |

* cited by examiner

METHOD AND ELECTRONIC DEVICE FOR DETECTING FINGERPRINT

CROSS-REFERENCE TO RELATED APPLICATION(S)

This application is based on and claims priority under 35 U.S.C. § 119 to Korean Patent Application No. 10-2017-0031619, filed on Mar. 14, 2017, in the Korean Intellectual Property Office, the disclosure of which is incorporated by reference herein in its entirety.

TECHNICAL FIELD

The disclosure relates to a fingerprint detection method and an electronic device for performing the same.

BACKGROUND

Biometrics is a method that recognizes a user by using human physical characteristics. For effective use of biometrics, features have to be ensured, such as uniqueness, permanence, collectability, and the like. Biometric characteristics used in biometrics include fingerprint, face, iris, veins, and the like. In general, human fingerprints are nearly unique and difficult to alter over the life of individuals. Due to the features of fingerprints and user convenience, fingerprint recognition has been most widely used among the biometric characteristics.

A fingerprint sensor for detecting a fingerprint may be equipped in a portable electronic device, such as a smartphone, a tablet PC, or the like, with an increase in an interest in protection of personal information. The portable electronic device may safely provide various services requiring security, based on a fingerprint image obtained from a user.

The above information is presented as background information only to assist with an understanding of the disclosure. No determination has been made, and no assertion is made, as to whether any of the above might be applicable as prior art with regard to the disclosure.

SUMMARY

The fingerprint sensor may be equipped in a part (e.g., a physical button) of an external appearance of the electronic device, or may be superposed on a display of the electronic device. However, since the fingerprint sensor is disposed in a limited space of the electronic device, the fingerprint sensor is likely to be affected by other circuit components. The influences of the other circuit components may cause noise in the fingerprint sensor and may be obstacles to accurately detecting a fingerprint image by the fingerprint sensor.

Aspects of the disclosure are to address at least the above-mentioned problems and/or disadvantages and to provide at least the advantages described below. Accordingly, an aspect of the disclosure is to provide a method for controlling some modules included in an electronic device to allow a fingerprint sensor included in the electronic device to measure a user's fingerprint image with high accuracy and reliability.

In accordance with an aspect of the disclosure, an electronic device is provided. The electronic device includes a display panel, a touch sensor for sensing an input from a user, a biometric sensor, and at least one processor. The at least one processor receives the input through the biometric sensor, and while the input is being received through the biometric sensor, the at least one processor discards a sensed signal from the touch sensor and obtains biometric information corresponding to the input through the biometric sensor.

In accordance with another aspect of the disclosure, an electronic device is provided. The electronic device includes a display panel for displaying a first frame and a second frame subsequent to the first frame, a touch sensor for sensing an input from a user for a first specified interval falling within an interval between the first frame and the second frame, a biometric sensor for detecting biometric information for a second specified interval falling within the interval between the first frame and the second frame and not overlapping the first specified interval, and at least one processor. The at least one processor senses the input for the first specified interval through the touch sensor and obtains biometric information corresponding to the input for the second specified interval through the biometric sensor.

In accordance with another aspect of the disclosure, an electronic device is provided. The electronic device includes a display including a touch sensor and a display panel, a fingerprint sensor included in the display or disposed on a rear surface of the display, and at least one processor electrically connected with the display and the fingerprint sensor. The at least one processor holds an operation of the touch sensor or lowers a frequency of an operating signal of the touch sensor in response to a specified event, activates the fingerprint sensor, and captures a fingerprint image from the fingerprint sensor.

In accordance with another aspect of the disclosure, a fingerprint detection method is provided. The fingerprint detection method includes lowering a frequency of an operating signal of a touch sensor in response to a specified event, activating a fingerprint sensor, and capturing a fingerprint image from the fingerprint sensor.

According to various embodiments of the disclosure, in response to an event for starting fingerprint detection, an operating method of a touch sensor or a wireless charger module may be changed to detect a high-reliable fingerprint image. In addition, the disclosure may provide various effects that are directly or indirectly recognized.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
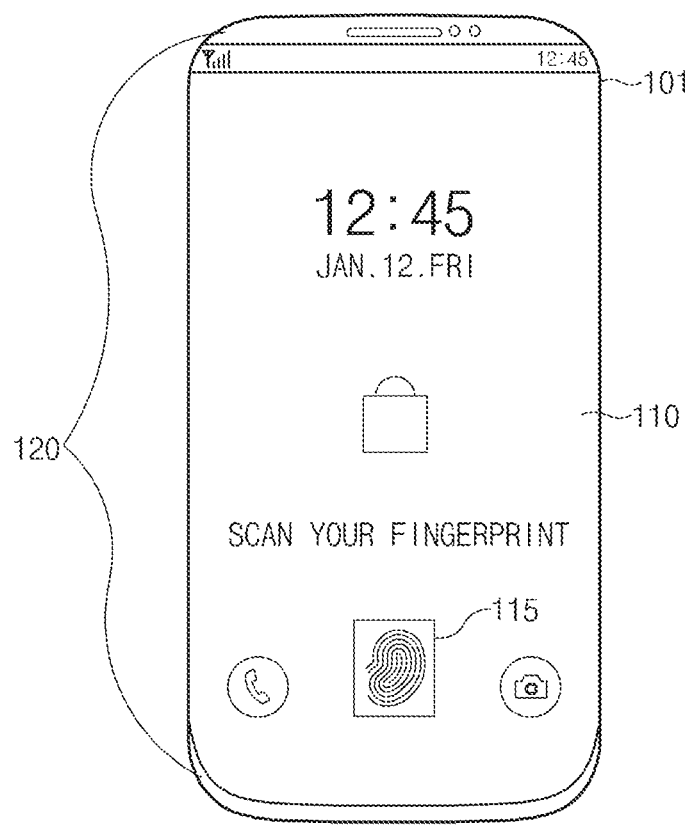
FIG. 1 is a front view of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group phase 1 or phase 2 (MPEG-1 or MPEG-2) audio layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, global navigation satellite system (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and new electronic devices according to the development of technologies.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

FIG. 1 is a front view of an electronic device according to an embodiment of the disclosure.

Referring to FIG. 1, an electronic device 101 according to an embodiment may include a display 110 and a housing 120. The display 110 may occupy substantially the entire front surface of the electronic device 101. A part of the housing 120 constituting side surfaces of the electronic device 101 may be exposed on the front surface of the electronic device 101.

According to an embodiment, in response to an event caused by a user (e.g., a touch, pressing of a physical button, detection of motion by a gyro sensor/acceleration sensor, or the like), the electronic device 101 may output a lock screen requiring user authentication on the display 110. For example, a status bar, date and time, and various icons may be included in the lock screen. The entire lock screen (display area) displayed on the display 110 may correspond to a touch detection area of a touch sensor included in the display 110.

According to an embodiment, an instruction to request fingerprint authentication from the user (an example of a biometric authentication user interface (UI)) and a guide 115 representing a fingerprint detection area may be output on the lock screen. The fingerprint detection area may correspond to the area where the guide 115 (an example of a biometric authentication UI) is displayed, and may constitute a part of the touch detection area of the display 110. A fingerprint sensor according to various embodiments of the disclosure may be disposed inside the electronic device 101 to correspond to the area where the guide 115 is displayed. Accordingly, a fingerprint authentication process may start, for example, when the user touches his/her finger to the guide 115.

According to various embodiments, the fingerprint detection area may be substantially the same as the touch detection area. That is, in this case, an area through which to detect the user's fingerprint may correspond to the entire lock screen displayed on the display 110.

Figure 2:
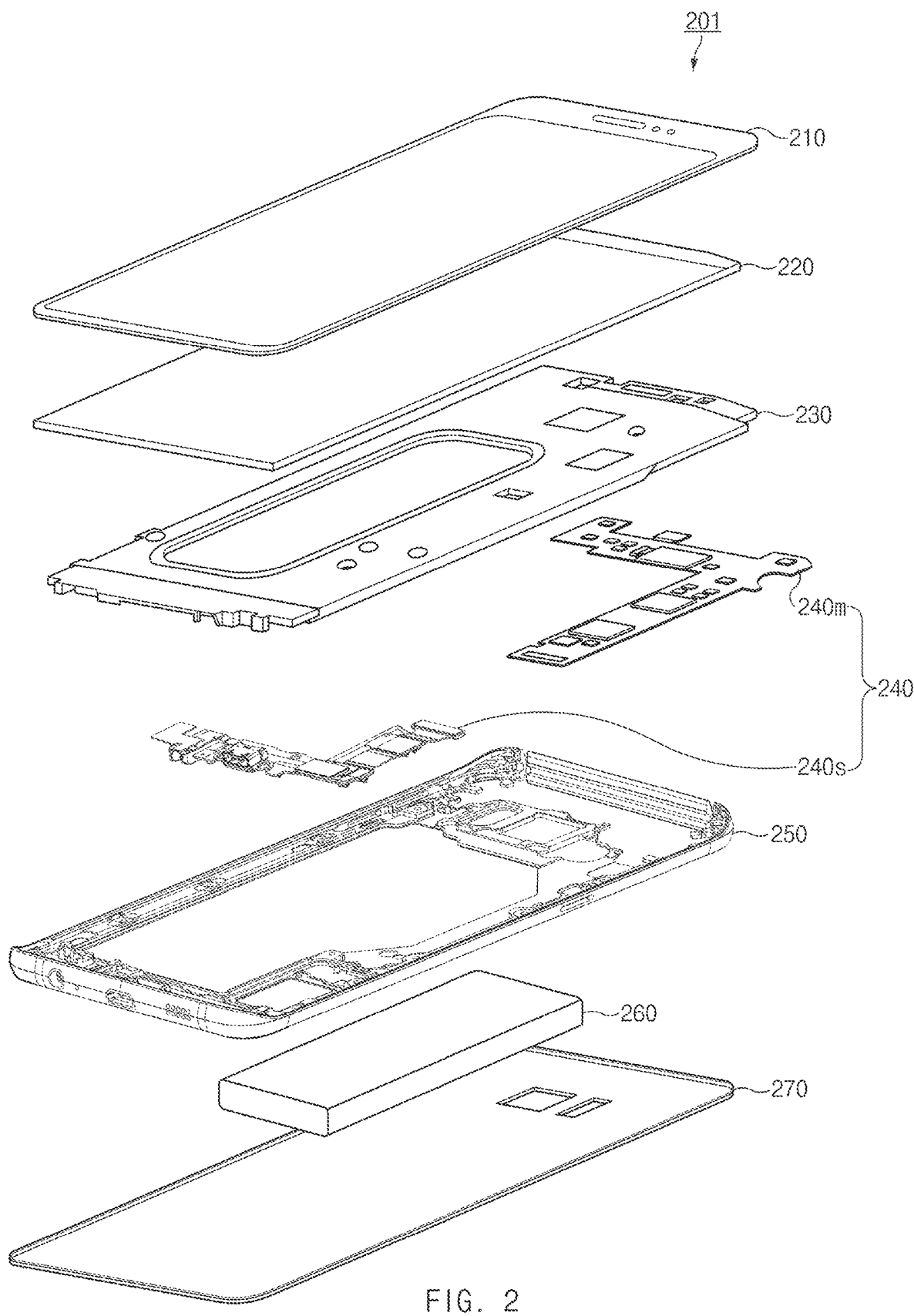
FIG. 2 is an exploded perspective view of an electronic device according to an embodiment of the disclosure.

FIG. 2 is an exploded perspective view of an electronic device according to an embodiment of the disclosure.

Referring to FIG. 2, an electronic device 201 according to an embodiment may include a cover glass 210, a display 220, a bracket 230, a printed circuit board 240, a rear housing 250, a battery 260, and/or a back cover 270. According to various embodiments, the electronic device 201 may not include some of the components illustrated in FIG. 2 and may further include components not being illustrated in FIG. 2.

The cover glass 210 may pass light generated by the display 220. Furthermore, a user may perform a touch (including contact using an electronic pen) and/or fingerprint authentication by touching the cover glass 210 with a part (e.g., a finger) of the user's body. The cover glass 210 may be formed of, for example, reinforced glass, reinforced plastic, a flexible polymer material, or the like to protect the display 220 and the components included in the electronic device 201 from external shocks. According to various embodiments, the cover glass 210 may also be referred to as a glass window.

The display 220 may be disposed or coupled below the cover glass 210 and may be exposed through the cover glass 210. The display 220 may output contents (e.g., text, an image, a video, an icon, a widget, a symbol, or the like), or may receive a touch input (e.g., a touch, a gesture, or hovering) from the user. The display 220 may include, for example, a display panel, a touch panel, and/or a fingerprint sensor. The display 220 may have, on a rear surface thereof, a thin film, a sheet, or a plate that is formed of copper (Cu) or graphite. A stack structure of the display 220 will be described below in more detail with reference to FIGS. 4A to 4D.

According to an embodiment, the display panel of the display 220 may include a liquid crystal display (LCD) panel, a light-emitting diode (LED) display panel, an organic LED (OLED) display panel, a microelectromechanical systems (MEMS) display panel, or an electronic paper display panel. Furthermore, the touch panel included in the display 220 may include, for example, a capacitive touch panel, a pressure-sensitive touch panel, a resistive touch panel, or an infrared touch panel.

The bracket 230 may be formed of, for example, a magnesium alloy and may be disposed below the display 220 and above the printed circuit board 240. The bracket 230 may be combined with the display 220 and the printed circuit board 240 to physically support the display 220 and the printed circuit board 240. According to an embodiment, the bracket 230 may have a swelling gap formed therein in consideration of swelling of the battery 260 according to a secular change.

The printed circuit board 240 may include, for example, a main printed circuit board 240*m* and a sub-printed circuit board 240*s*. According to an embodiment, the main printed circuit board 240*m* and the sub-printed circuit board 240*s* may be disposed below the bracket 230 and may be electrically connected with each other through a connector or interconnection wiring. The printed circuit boards 240*m* and 240*s* may be implemented with, for example, a rigid printed circuit board (rigid PCB). The printed circuit boards 240m and 240s may be referred to as a main board, a printed board assembly (PBA), or simply a PCB. Various types of electronic components (e.g., a processor, a memory, and the like), elements, printed circuits, and the like of the electronic device 201 may be mounted or arranged on the printed circuit boards 240m and 240s.

The rear housing 250 may be disposed below the printed circuit board 240 to accommodate the components of the electronic device 201. The rear housing 250 may form a lateral side of the electronic device 201. The rear housing 250 may also be referred to as a rear case, a rear plate, or the like. The rear housing 250 may be formed of metal. The exposed lateral area of the rear housing 250 formed of metal may also be referred to as a metal bezel. According to an embodiment, at least a part of the metal bezel may be used as an antenna radiator for transmitting and receiving signals of a specified frequency.

The battery 260 may bilaterally convert between chemical energy and electrical energy. For example, the battery 260 may convert chemical energy into electrical energy and may supply the electrical energy to the display 220 and various components or modules mounted on the printed circuit board 240. The battery 260 may also convert electrical energy supplied from the outside into chemical energy and may store the chemical energy. According to an embodiment, a power management module for managing charge/discharge of the battery 260 may be included in the printed circuit board 240.

The back cover 270 may be coupled to a rear surface of the electronic device 201. The back cover 270 may be formed of reinforced glass, a plastic injection-molded material, metal, and/or the like. According to various embodiments, the back cover 270 may be implemented integrally with the rear housing 250, or may be implemented to be detachable by the user.

Figure 3:
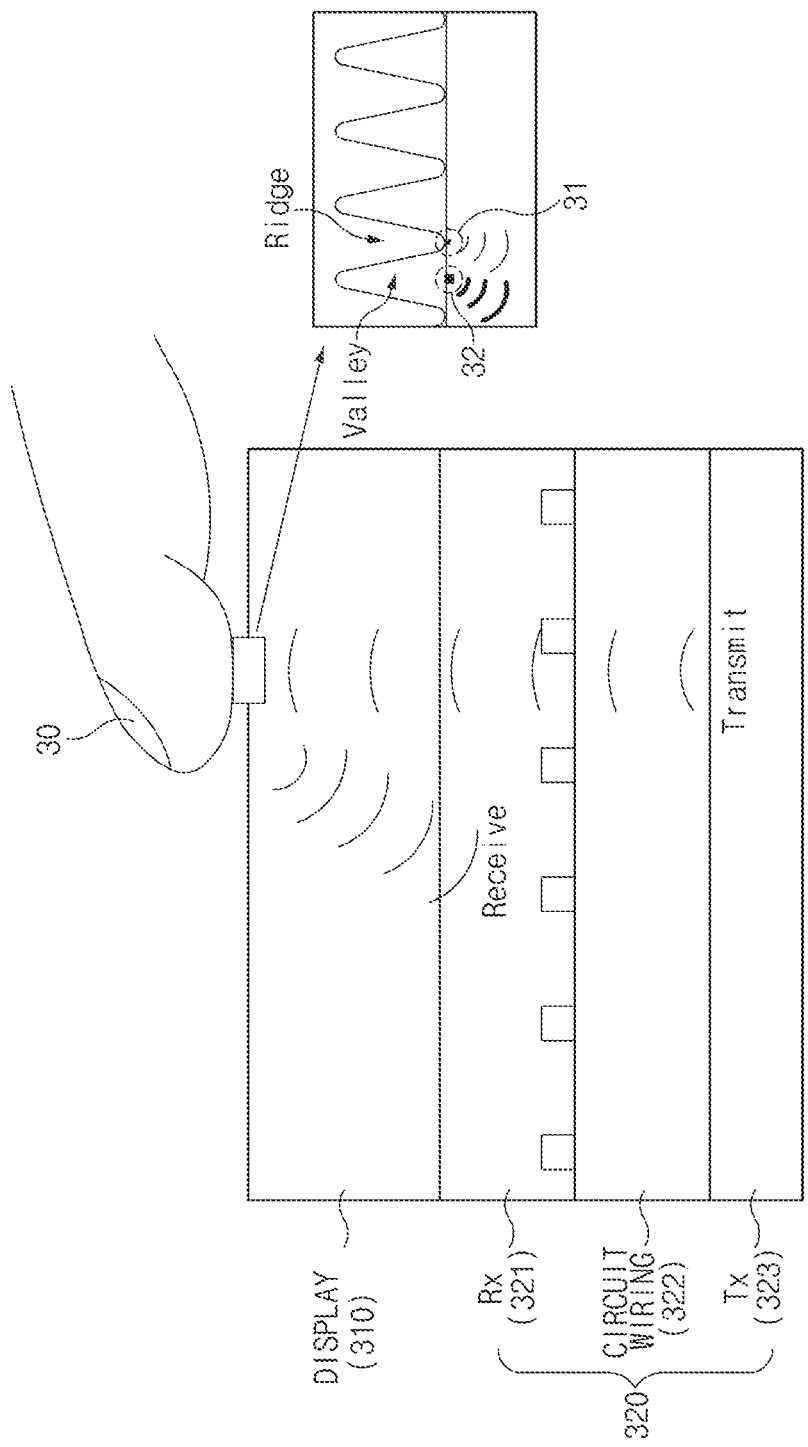
FIG. 3 illustrates an ultrasonic fingerprint sensor according to an embodiment of the disclosure.

FIG. 3 illustrates an ultrasonic fingerprint sensor according to an embodiment of the disclosure.

Referring to FIG. 3, an ultrasonic fingerprint sensor 320 according to an embodiment may be disposed on a rear surface of a display 310. The ultrasonic fingerprint sensor 320 may include an ultrasonic receiver Rx 321, circuit wiring 322 inside the ultrasonic fingerprint sensor 320, and an ultrasonic transmitter Tx 323. Although the display 310, the ultrasonic receiver 321, the circuit wiring 322 inside the ultrasonic fingerprint sensor 320, and the ultrasonic transmitter 323 are sequentially arranged, the disclosure is not limited thereto. For example, various arrangements illustrated in FIGS. 4A to 4D are also possible. Furthermore, the display 310 disposed on the ultrasonic fingerprint sensor 320 may be an arbitrary component and may also be referred to as a "platen".

According to an embodiment, the ultrasonic transmitter 323 may generate ultrasonic waves of a specific frequency. The ultrasonic receiver 321 may receive reflected waves of the ultrasonic waves generated by the ultrasonic transmitter 323. For example, when the ultrasonic transmitter 323 generates ultrasonic waves, the ultrasonic waves may reach the border between the display 310 and a user's finger 30. A part of the ultrasonic waves may be reflected from the border and may reach the ultrasonic receiver 321. The ultrasonic receiver 321 may sense the intensity of the received reflected waves. A fingerprint sensor (e.g., a fingerprint sensor integrated circuit (IC)) may generate the user's fingerprint image on the basis of the intensity of the reflected waves.

In general, in the case where (ultrasonic) sound waves (acoustic waves or ultrasonic waves) pass through two different mediums, some of the (ultrasonic) sound waves may be reflected from the border between the two mediums, and the others may pass through the border. At this time, if there is a large difference in acoustic impedance between the two mediums, the intensity of the reflected waves, which are reflected from the border between the two mediums, may be strengthened, and in contrast, if there is a small difference in acoustic impedance between the two mediums, the intensity of the reflected waves may be weakened.

The acoustic impedance of human skin may be about $1.6 \times 10^6$ kg/m²·sec, and the acoustic impedance of air may be about 400 kg/m²·sec. The human skin and air may have a significant difference in acoustic impedance therebetween. Referring to FIG. 3 in consideration of this characteristic, the ultrasonic waves generated by the ultrasonic transmitter 323 may be less reflected from ridges 31 where the fingerprint of the finger 30 makes direct contact with the display 310, and may be greatly reflected from valleys 32 where the fingerprint of the finger 30 does not make contact with the display 310. The ultrasonic receiver 321 may sense the intensity of the reflected waves of the ultrasonic waves to contribute to generating a fingerprint image of the finger 30.

FIGS. 4A to 4D illustrate stack structures of a display and a fingerprint sensor, according to various embodiments of the disclosure.

Referring to FIGS. 4A to 4D, stack structures 400a to 400d of a display and a fingerprint sensor, according to various embodiments, are illustrated. The stack structures 400a to 400d illustrated in FIGS. 4A to 4D are merely illustrative, and the disclosure is not limited to the illustrated examples. In the following description, similar reference numerals are intended to denote similar elements, and repetitive descriptions thereof will be omitted.

Figure 4A:
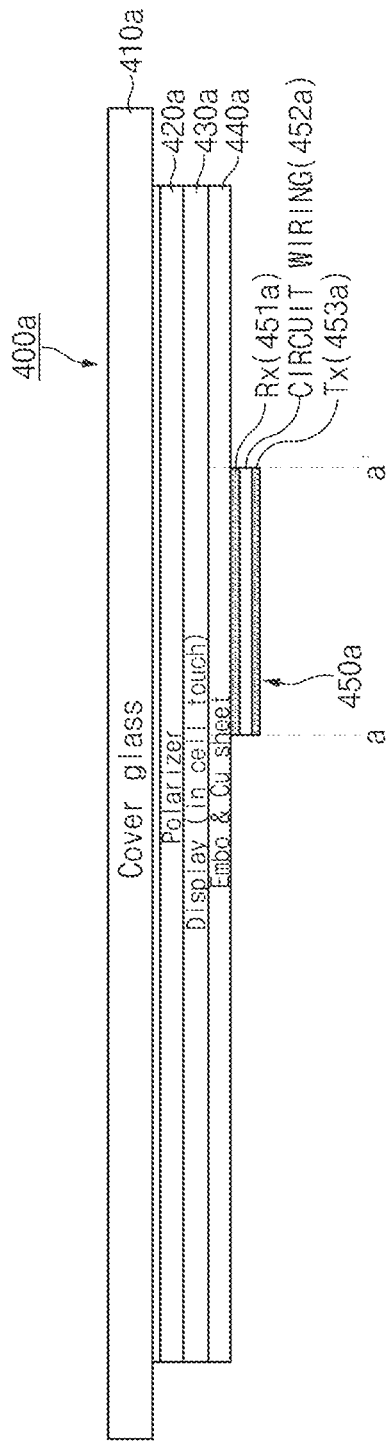
FIGS. 4A, 4B, 4C, and 4D illustrate stack structures of a display and a fingerprint sensor, according to various embodiments of the disclosure.

The stack structure 400a according to an embodiment, which is illustrated in FIG. 4A, may include a cover glass 410a, a polarizer 420a, a touch display 430a, an embo sheet 440a, and an ultrasonic fingerprint sensor 450a. The polarizer 420a may pass light polarized in a specified direction to enhance outdoor visibility. The embo sheet 440a may include an "embossing cushion" for alleviating external pressure/shock, a heat dissipation plate, a Cu/Graphite sheet serving as a ground, and/or the like. As described above with reference to FIG. 3, the ultrasonic fingerprint sensor 450a may include an ultrasonic receiver 451a, circuit wiring 452a, and an ultrasonic transmitter 453a.

In the stack structure 400a according to an embodiment, the ultrasonic fingerprint sensor 450a may be disposed on a portion of a rear surface of the embo sheet 440a. According to various embodiments, unlike that illustrated in FIG. 4A, the ultrasonic fingerprint sensor 450a may also be attached to substantially the entire rear surface of the embo sheet 440a (e.g., see FIGS. 4C and 4D). Furthermore, according to various embodiments, the ultrasonic fingerprint sensor 450a may be mounted in a space formed by cutting away portion a-a' from the embo sheet 440a. Accordingly, the ultrasonic fingerprint sensor 450a may be disposed on a rear surface of the touch display 430a.

Figure 4B:
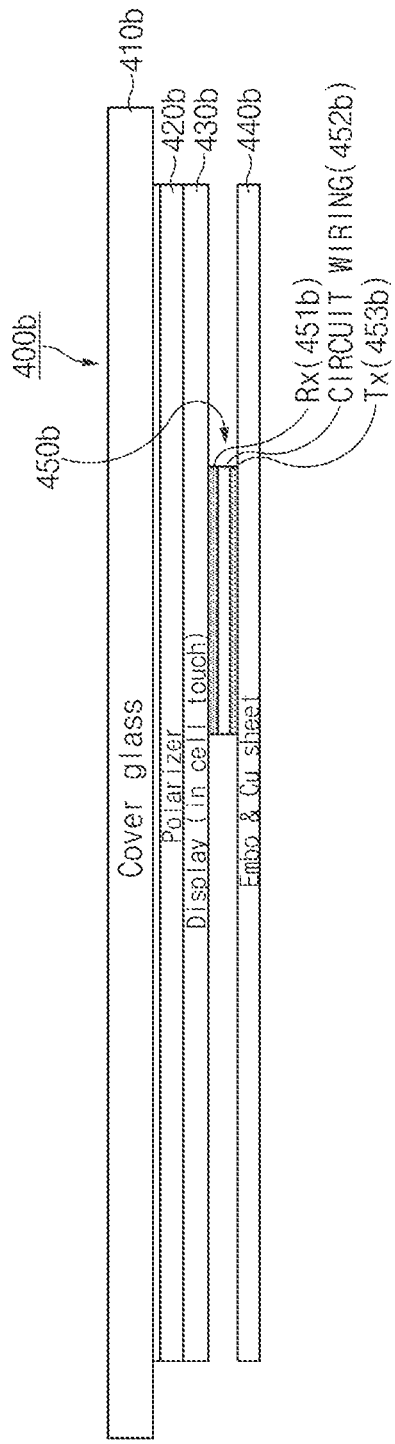

Referring to FIG. 4B, the stack structure 400b according to an embodiment may include a cover glass 410b, a polarizer 420b, a touch display 430b, an ultrasonic fingerprint sensor 450b, and an embo sheet 440b. In the stack structure 400b according to an embodiment, the ultrasonic fingerprint sensor 450b (an example of a biometric sensor) may be disposed between the touch display 430b and the embo sheet 440b, unlike in the stack structure 400a of FIG. 4A. As described above with reference to FIG. 3 or 4A, the ultrasonic fingerprint sensor 450b may include an ultrasonic receiver 451b, circuit wiring 452b, and an ultrasonic transmitter 453b.

Figure 4C:
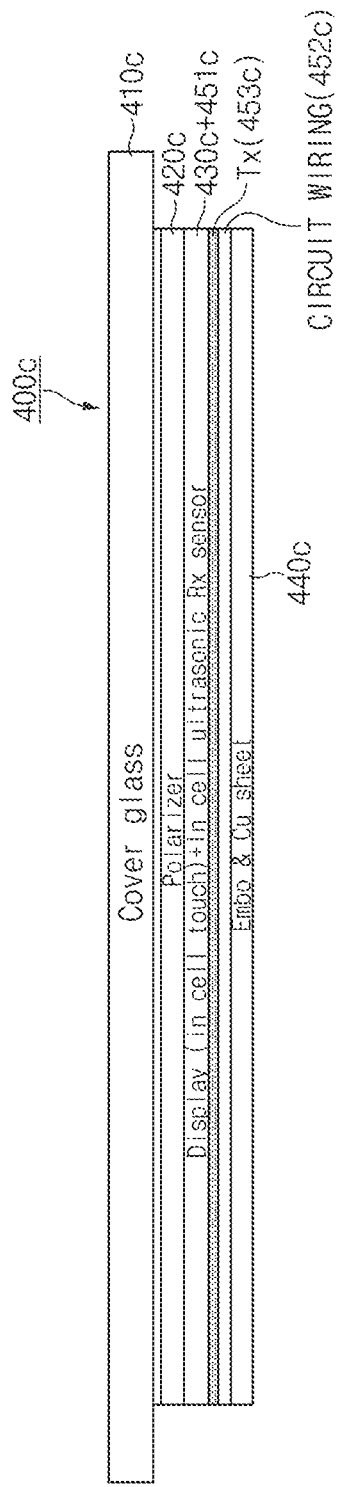

Referring to FIG. 4C, the stack structure 400c according to an embodiment may include a cover glass 410c, a polarizer 420c, a touch display 430c in which a receiver 451c of an ultrasonic fingerprint sensor is included, a transmitter 453c of the ultrasonic fingerprint sensor, circuit wiring 452c of the ultrasonic fingerprint sensor, and an embo sheet 440c.

In the stack structure 400c, the receiver 451c of the ultrasonic fingerprint sensor may be included in a pixel array of the touch display 430c in an in-cell type. The receiver 451c of the ultrasonic fingerprint sensor may be arranged in a grid type, a zigzag type, or a symmetry type depending on recognition performance.

Figure 4D:
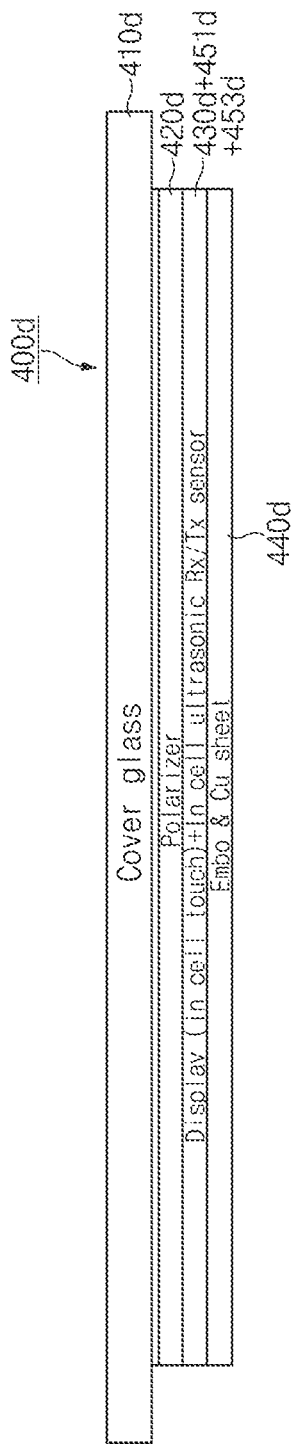

Referring to FIG. 4D, the stack structure 400d according to an embodiment may include a cover glass 410d, a polarizer 420d, a touch display 430d in which a receiver 451d and a transmitter 453d of an ultrasonic fingerprint sensor are included, and an embo sheet 440d.

In the stack structure 400d, the receiver 451d and the transmitter 453d of the ultrasonic fingerprint sensor may be included in a pixel array of the touch display 430d in an in-cell type. The receiver 451d and the transmitter 453d of the ultrasonic fingerprint sensor may be arranged in a grid type, a zigzag type, or a symmetry type depending on recognition performance.

Figure 5:
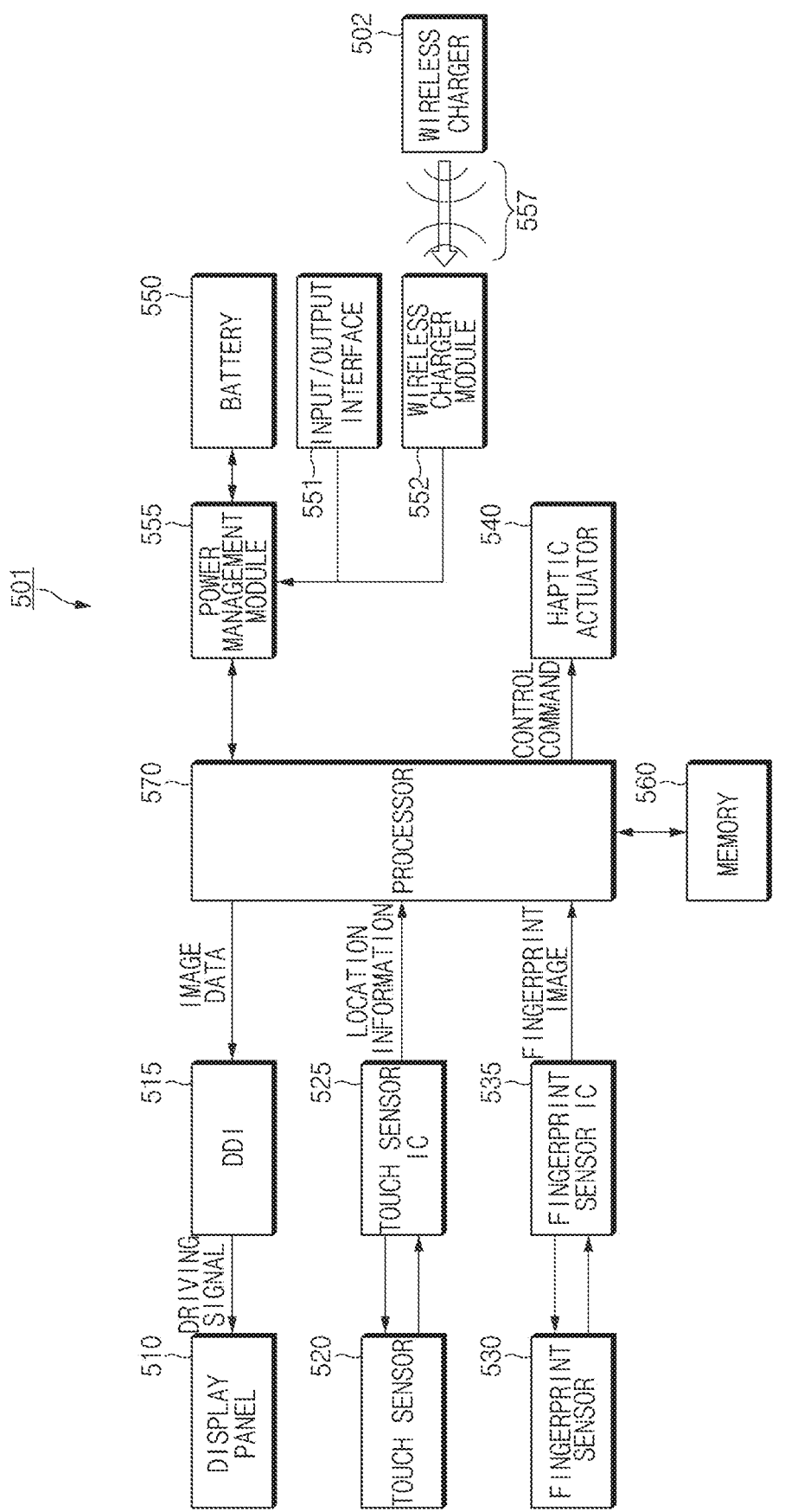
FIG. 5 is a block diagram of an electronic device according to an embodiment of the disclosure.

FIG. 5 is a block diagram of an electronic device according to an embodiment of the disclosure.

Referring to FIG. 5, an electronic device 501 according to an embodiment may include a display panel 510, a display driving IC (DDI) 515, a touch sensor 520, a touch sensor IC 525, a fingerprint sensor 530, a fingerprint sensor IC 535, a haptic actuator 540, a battery 550, an input/output interface 551, a wireless charger module 552, a power management module 555, a memory 560, and/or a processor 570 (e.g., at least one processor).

The display panel 510 may receive a driving signal from the display driving IC (DDI) 515. The display panel 510 may display various contents (e.g., text, an image, a video, an icon, a symbol, or the like) on the basis of the driving signal. In this disclosure, the display panel 510 may include the touch sensor 520 and/or the fingerprint sensor 530, or may be combined with the touch sensor 520 and/or the fingerprint sensor 530 in an overlapping manner (e.g., see FIGS. 4A to 4D). For example, in the case where the display panel 510 and the touch sensor 520 are combined together, the assembly may be referred to as a "touch screen display" or simply a "display".

According to an embodiment, the display driving IC (DDI) 515 may supply an image driving signal corresponding to image data received from the processor (host) 570, to the display panel 510 at a preset frame rate (corresponding to the frequency of a vertical synchronizing signal VSYNC). Although not illustrated, the DDI 515, according to an embodiment, may include a graphic RAM, an interface module, an image processing unit, a multiplexer, a display timing controller (T-con), a source driver, a gate driver, an oscillator, and/or the like.

In the touch sensor 520, a specified physical quantity (e.g., voltage, quantity of light, resistance, quantity of electric charge, capacitance, or the like) may be changed by a user's touch. According to an embodiment, the touch sensor 520 may be superposed on the display panel 510. According to an embodiment, the touch sensor 520 may correspond to a capacitive touch sensor that supports a mutual capacitance method and a self-capacitance method. According to an embodiment, the touch sensor 520 may include an electronic pen sensor (or a digitizer sensor) that is capable of recognizing hovering or contact from an electronic pen (e.g., a stylus pen).

The touch sensor IC 525 may sense a change of a physical quantity in the touch sensor 520 and may compute the location (X, Y) where a touch is made, on the basis of the change of the physical quantity (e.g., voltage, resistance, capacitance, or the like). The computed location (coordinate) information may be provided to the processor 570. According to an embodiment, the touch sensor IC 525 may be referred to as a touch IC, a touch screen IC, a touch controller, a touch screen controller IC, or the like.

The fingerprint sensor 530 may be included in the display (an assembly of the display panel 510 and the touch sensor 520), or may be disposed on a rear surface of the display (see FIGS. 4A to 4D). The fingerprint sensor 530 may have a fingerprint detection area that has an area corresponding to (e.g., substantially the same as) an active area of the display panel 510 or corresponds to a partial area of the display panel 510. The fingerprint sensor 530 may detect or capture an image of the user's fingerprint that makes contact with the fingerprint detection area. Although the fingerprint sensor 530 is presented as an example of a biometric sensor in FIG. 5, the disclosure is not limited thereto. For example, the fingerprint sensor 530 may be replaced with various biometric sensors capable of detecting the user's biometric characteristics (or biometric information), such as an iris, a face, and the like.

The fingerprint sensor 530 may be classified as an optical fingerprint sensor, an ultrasonic fingerprint sensor, or a capacitive fingerprint sensor depending on a physical quantity used to capture the fingerprint image. In another aspect, an area type to recognize a fingerprint on an area-by-area basis may be applied to the fingerprint sensor 530. For the convenience of description, the fingerprint sensor 530 will hereinafter be described as a fingerprint sensor to which an area type and an ultrasonic type are applied, although not being limited thereto.

The fingerprint sensor IC 535 may drive the fingerprint sensor 530 and may scan at least a partial area of the fingerprint sensor 530. The fingerprint sensor IC 535 may capture a fingerprint image through the scanning. When the fingerprint sensor IC 535 provides the fingerprint image to the processor 570, the processor 570 may extract unique fingerprint features from the fingerprint image and may identify the fingerprint on the basis of the extracted features. For example, fingerprint minutia may include various minutia points, such as ridge ending, crossover, bifurcation, core, delta, pore, and the like, which are included in the fingerprint.

The fingerprint sensor IC 535 may convert DC 20V received to operate the fingerprint sensor 530 into AC 330V/8 MHz and may supply it to the fingerprint sensor 530. An ultrasonic transmitter Tx of the fingerprint sensor 530 may physically vibrate according to the supplied AC power to generate ultrasonic waves. The ultrasonic transmitter Tx may be implemented with, for example, a transducer including a material, such as poly (vinylidene fluoride) (PVDF) or polytetrafluoroethylene (PTFE).

The haptic actuator 540 may provide haptic feedback (e.g., vibration) to the user according to a control command of the processor 570. For example, when a touch input (e.g., including a touch, hovering, or a force touch) is received from the user, the haptic actuator 540 may provide haptic feedback to the user.

The battery 550 may supply electrical energy to various circuit components or modules mounted in the electronic device 501 under the control of the power management module 555. Alternatively, the battery 550 may convert electrical energy obtained from an external device (e.g., a wireless charger 502) into chemical energy and may accumulate the chemical energy, under the control of the power management module 555.

The input/output interface 551 may serve as, for example, an interface that forwards commands, data, or power obtained from an external device to the other elements of the electronic device 501. Furthermore, the input/output interface 551 may output commands, data, or power obtained from the other elements of the electronic device 501 to the external device. According to an embodiment, the input/output interface 551 may employ various standards, for example, universal serial bus (USB), high definition multimedia interface (HDMI), recommended standard-232 (RS-232), or plain old telephone service (POTS).

The wireless charger module 552 may be magnetically inductively coupled with the wireless charger 502 (see reference numeral 557). The wireless charger module 552 may receive power wirelessly transmitted from the wireless charger 502, or may communicate with the wireless charger 502 on the basis of load modulation. To this end, the wireless charger module 552 may include a coil loop, a resonance circuit, a rectifier, or the like. The wireless charger module 552 and the wireless charger 502 may use, for example, an electromagnetic induction method and/or a magnetic resonance method. The electromagnetic induction method may comply with protocols established by standard groups, such as power matters alliance (PMA) and wireless power consortium (WPC), and the magnetic resonance method may comply with a protocol established by, for example, alliance for wireless power (A4WP).

The power management module 555 may control charge/discharge of the battery 550 and transmission of power transmitted/received through the input/output interface 551 and the wireless charger module 552. The power management module 555 may include a power management integrated circuit (PMIC), a charger integrated circuit (IC), and the like. According to various embodiments, the power management module 555 may also be referred to as a meaning that includes the input/output interface 551 and the wireless charger module 552.

The memory 560 may store commands or data associated with operations of the elements included in the electronic device 501. For example, the memory 560 may store instructions that, when executed by the processor 570, allow the processor 570 to perform various operations set forth in this disclosure (e.g., operations illustrated in FIG. 9).

According to an embodiment, the memory 560 may store data (e.g., a fingerprint template) about at least one enrolled fingerprint (or reference fingerprint) enrolled in advance by a legitimate user. The data about the enrolled fingerprint may be stored in, for example, a trust zone of the memory 560 that is a memory space to which a predetermined security policy is applied.

The processor 570 may be electrically connected with, for example, the elements 510 to 560 included in the electronic device 501 to perform operations or data processing relating to control and/or communication of the elements 510 to 560.

According to an embodiment, the processor 570 may determine whether a specified event has occurred, and in response to the specified event, the processor 570 may perform various operations to allow the fingerprint sensor 530 to detect a fingerprint image with high accuracy and reliability.

According to an embodiment, the specified event may include displaying of a specified UI on the display panel 510. The specified UI may be an interface for requesting biometric authentication (e.g., fingerprint authentication) from the user and may be, for example, a "lock screen" or a "fingerprint input interface". According to various embodiments, the specified event may include execution of an authentication application (e.g., Samsung Pay™ or Apple Pay™) that at least partially requires biometric authentication, or displaying of a partial UI of the authentication application. For example, the specified event may include execution of the authentication application or displaying of a UI (a biometric authentication UI) that requests the user's biometric authentication (e.g., a fingerprint input) necessary for making a payment in the authentication application. According to various embodiments, the authentication application may include a financial application of a credit-card company or a bank and may include a payment application, such as Samsung Pay™ or Apple Pay™.

According to another embodiment, the specified event may include detection of the user's touch by the touch sensor 520. When the user touches the display and the touch sensor 520 included in the display detects the touch, the processor 570 may recognize the touch as the specified event. For example, a touch on a region that corresponds to the fingerprint detection area (e.g., 115 of FIG. 1) of the fingerprint sensor 530, which is a part of the entire touch detection area of the touch sensor 520 (that is, the entire display area) may be recognized as the specified event by the processor 570. Alternatively, without being limited thereto, the processor 570 may also recognize a touch on an arbitrary position of the display as the specified event.

According to an embodiment, the processor 570 may activate or enable the fingerprint sensor 530 in response to the specified event and may capture a fingerprint image by using the fingerprint sensor 530.

According to an embodiment, the processor 570 may capture the user's fingerprint image by using the fingerprint sensor 530 for a period of time during which an operating signal of the touch sensor 520 is logical low. To this end, in response to the specified event, the processor 570 may hold an operation of the touch sensor 520, or may lower the frequency of the operating signal of the touch sensor 520. In another example, in response to the specified event, the processor 570 may lower the duty cycle of the operating signal of the touch sensor 520, or may lower the intensity of the operating signal.

According to various embodiments, the touch sensor 520 may be a capacitive touch sensor that supports both a mutual capacitance method and a self-capacitance method. In this case, in response to the specified event, the processor 570 may change an operating method of the touch sensor 520 from a mutual capacitance method to a self-capacitance method. In another example, in response to the specified event, the processor 570 may change an operating method of the touch sensor 520 from a self-capacitance method to a mutual capacitance method. In short, the processor 570 may change an operating method of the touch sensor 520 to a method causing less noise.

According to an embodiment, additionally or alternatively, in response to the specified event, the processor 570 may control the wireless charger module 552 to hold receipt of wireless power from the wireless charger 502 or to raise the transmission frequency of the wireless power. To control the transmission frequency, the processor 570 may modulate a load of the wireless charger module 552 to communicate with the wireless charger 502 (what is called in-band communication).

According to an embodiment, while receiving an input from the user through a biometric sensor (e.g., the fingerprint sensor 530), the processor 570 may discard a signal (e.g., touch location information) sensed by the touch sensor 520 and may obtain biometric information (e.g., a fingerprint image) corresponding to the input through the biometric sensor (e.g., the fingerprint sensor 530).

A mutual influence (e.g., noise) between the display panel 510, the touch sensor 520, the fingerprint sensor 530, and/or the wireless charger module 552 may be minimized by the above-described operations of the processor 570, and this may help to prevent malfunctions in the respective components and to contribute to accurate operations thereof.

According to an embodiment, when capturing the fingerprint image as described above, the processor 570 may return the touch panel 520 or the wireless charger module 552 to the original state prior to the occurrence of the specified event. For example, if the frequency of the operating signal of the touch sensor 520 was lowered in response to the specified event, the processor 570 may raise the frequency of the operating signal of the touch sensor 520 to the original level.

The above-described operations of the processor 570 are merely illustrative, and the processor 570 is not limited thereto. For example, operations of a processor set forth in another part of this disclosure may also be construed as operations of the processor 570. Furthermore, in this disclosure, at least some of the operations set forth as being performed by the "electronic device" may be construed as operations of the processor 570. In addition, according to various embodiments, at least some of the operations of the processor 570 may also be performed by the fingerprint sensor IC 535.

Figure 6:
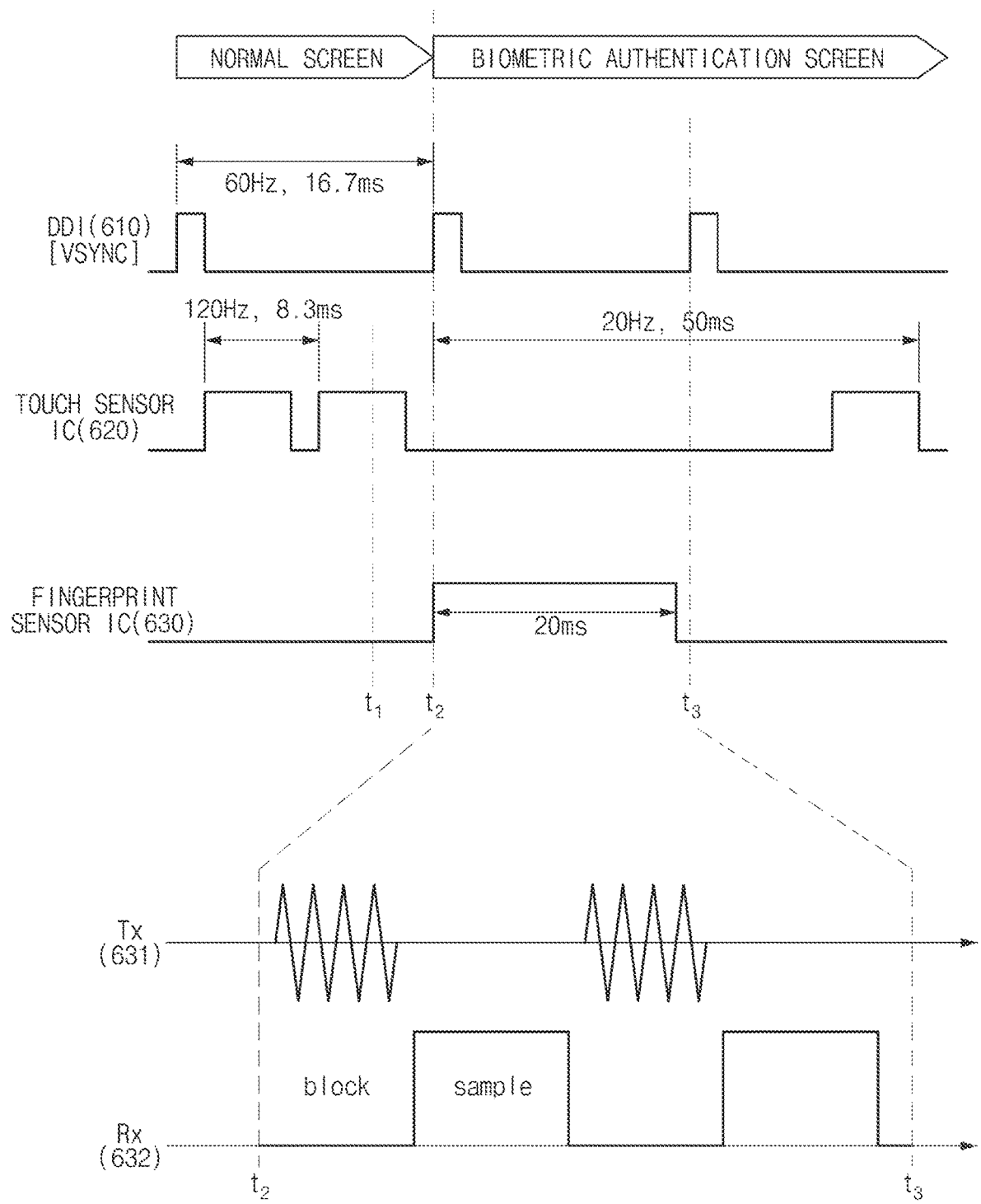
FIG. 6 illustrates a timing chart for explaining a fingerprint detection method according to an embodiment of the disclosure.

FIG. 6 illustrates a timing chart for explaining a fingerprint detection method according to an embodiment of the disclosure.

Referring to FIG. 6, an operating signal 610 of a DDI for driving a display panel, an operating signal 620 of a touch sensor IC for driving a touch sensor, an operating signal 630 of a fingerprint sensor IC for driving an ultrasonic fingerprint sensor, and operating signals 631 and 632 of an ultrasonic transmitter Tx and an ultrasonic receiver Rx included in the ultrasonic fingerprint sensor are illustrated. Irrespective of the name, the "operating signal" may correspond to a signal that allows a function of a module receiving the operating signal to start. For example, the operating signal 610 of the DDI may be a vertical synchronizing signal VSYNC, and an image frame displayed on the display panel may be changed depending on the vertical synchronizing signal.

According to an embodiment, the operating signal 610 of the DDI may supply a driving signal to the display panel at a frequency of 60 Hz. An image (a screen) received from a host (e.g., a processor) may be output on the display panel on the basis of the driving signal. Furthermore, the touch sensor IC may scan the touch sensor at a frequency of 120 Hz.

According to an embodiment, an electronic device may output a normal screen (e.g., a home screen) on the display panel before displaying a biometric authentication screen including a biometric authentication UI at time t2. The biometric authentication screen may be a screen displayed on a display by executing, for example, a payment application (e.g., Samsung Pay™, Apple Pay™, or the like), a financial application, or the like. In response to the displaying of the biometric authentication screen (an example of a specified event), the electronic device may lower the scan frequency of the touch sensor IC to, for example, 20 Hz and may transmit an interrupt to the fingerprint sensor IC. Due to the interrupt, the fingerprint sensor IC may provide the predetermined operating signal 630 to the ultrasonic fingerprint sensor to activate the ultrasonic fingerprint sensor.

According to various embodiments, the electronic device may detect a user's touch (an example of a specified event) through a specified area of the touch sensor at time t1. In response to the touch, the electronic device may lower the scan frequency of the touch sensor IC to 20 Hz at time t2 when the scan period during which the corresponding touch is made ends, and may transmit an interrupt to the fingerprint sensor IC. Due to the interrupt, the fingerprint sensor IC may provide the predetermined operating signal 630 to the ultrasonic fingerprint sensor to activate the ultrasonic fingerprint sensor.

The display panel may output the biometric authentication screen at time t2 on the basis of the operating signal 610 received from the DDI. The touch sensor IC may provide the operating signal 620 having the lowered frequency of 20 Hz to the touch sensor. Furthermore, the ultrasonic fingerprint sensor may be activated after time t2, for example, for an interval of t2 to t3 (20 ms) in response to the above-described specified event under the control of the fingerprint sensor IC. The activated ultrasonic fingerprint sensor may detect the user's fingerprint image for a period of time during which the touch sensor IC does not scan the touch sensor, that is, while the operating signal 620 for the touch sensor is logical low.

According to an embodiment, the ultrasonic transmitter Tx included in the activated ultrasonic fingerprint sensor may generate ultrasonic waves on the basis of AC power supplied from the fingerprint sensor IC. While the ultrasonic transmitter Tx is generating the ultrasonic waves, an operation of the ultrasonic receiver Rx may be blocked. In contrast, for an interval during which the ultrasonic transmitter Tx does not generate ultrasonic waves, the ultrasonic receiver Rx may receive (or sample) reflected waves of the ultrasonic waves.

According to an embodiment, in a first frame displayed on the display panel at time t2 and a subsequent second frame displayed on the display panel at time t3, the touch sensor may sense an input from the user for a first specified interval falling within the output interval of the first frame and the second frame. A biometric sensor may detect biometric information for a second specified interval (an interval during which the touch sensor IC 620 is logical low) that falls within the interval of the first frame and the second frame and does not overlap the first specified interval (an interval during which the touch sensor IC 620 is logical high). The processor may sense a touch input for the first specified interval through the touch sensor and may obtain the biometric information for the second specified interval through the biometric sensor.

According to an embodiment, the biometric information may be obtained in the case where activation of the biometric sensor is separately requested. For example, the biometric sensor may be activated after a predetermined input is received through a specified UI (e.g., a biometric authentication UI).

According to an embodiment, the first specified interval (the interval during which the touch sensor IC 620 is logical high) may be adjusted. For example, the first specified interval may be adjusted by lowering the duty cycle of a signal used by the touch sensor to sense an input or by lowering an operating frequency of the signal. An interval during which biometric information is detectable (an interval during which the touch sensor IC 620 is logical low) may be increased by adjusting the first specified interval. According to an embodiment, in the case where there is no input of biometric information, the processor may sense a touch input for a third interval including at least a portion of the second specified interval (the interval during which the touch sensor IC 620 is logical low), in addition to the first specified interval (the interval during which the touch sensor IC 620 is logical high).

Figure 7:
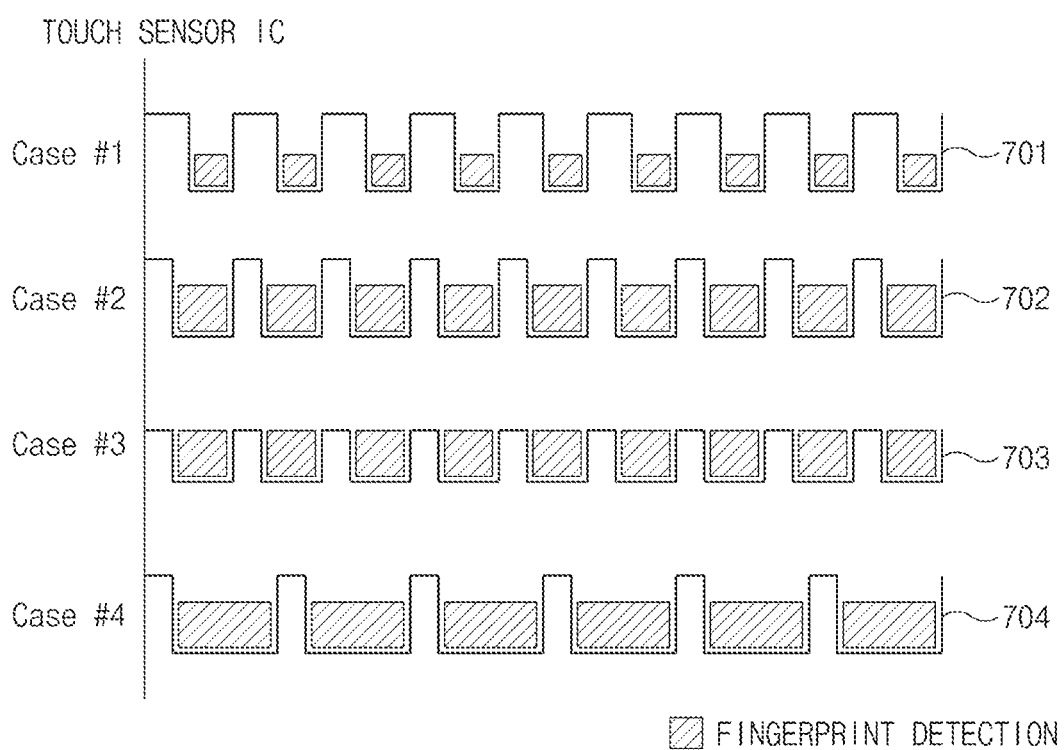
FIG. 7 illustrates timing charts for explaining fingerprint detection methods according to various embodiments of the disclosure.

FIG. 7 illustrates timing charts for explaining fingerprint detection methods according to various embodiments of the disclosure.

Referring to FIG. 7, operating signals (or touch scan signals) 701 to 704 of a touch sensor IC "after a specified event occurs" are illustrated. The operating signals 701 to 704 may replace, for example, the operating signal 620 of the touch sensor IC after time t2 illustrated in FIG. 6.

The operating signal 701 of the touch sensor IC according to an embodiment (Case #1) may have, for example, a frequency of 20 Hz and a duty cycle of 50%. A fingerprint sensor IC and a fingerprint sensor may capture a fingerprint image for time periods (hatching portions in FIG. 7) during which the operating signal 701 of the touch sensor IC is logical low.

The operating signal 702 of the touch sensor IC according to an embodiment (Case #2) may have, for example, a frequency of 20 Hz and a duty cycle of 30%. The fingerprint sensor IC and the fingerprint sensor may capture a fingerprint image for time periods (hatching portions in FIG. 7) during which the operating signal 702 of the touch sensor IC is logical low. Since the operating signal 702 of the touch sensor IC has a lower duty cycle than the operating signal 701 of the touch sensor IC, more time may be ensured to detect a fingerprint image.

The operating signal 703 of the touch sensor IC according to an embodiment (Case #3) may have, for example, a frequency of 20 Hz and a duty cycle of 30%, and in addition, the intensity of the operating signal 703 may correspond to 70% of that of the operating signal 702. Since the operating signal 703 of the touch sensor IC has a lower intensity than the operating signal 702 of the touch sensor IC, fingerprint image detection accuracy and reliability may be enhanced due to a reduction in noise.

The operating signal 704 of the touch sensor IC according to an embodiment (Case #4) may have, for example, a frequency of 15 Hz. The fingerprint sensor IC and the fingerprint sensor may capture a fingerprint image for time periods during which the operating signal 704 of the touch sensor IC is logical low. Since the operating signal 704 of the touch sensor IC has a lower frequency than the operating signal 701 in Case #1, more time may be ensured to detect a fingerprint image.

Figure 8:
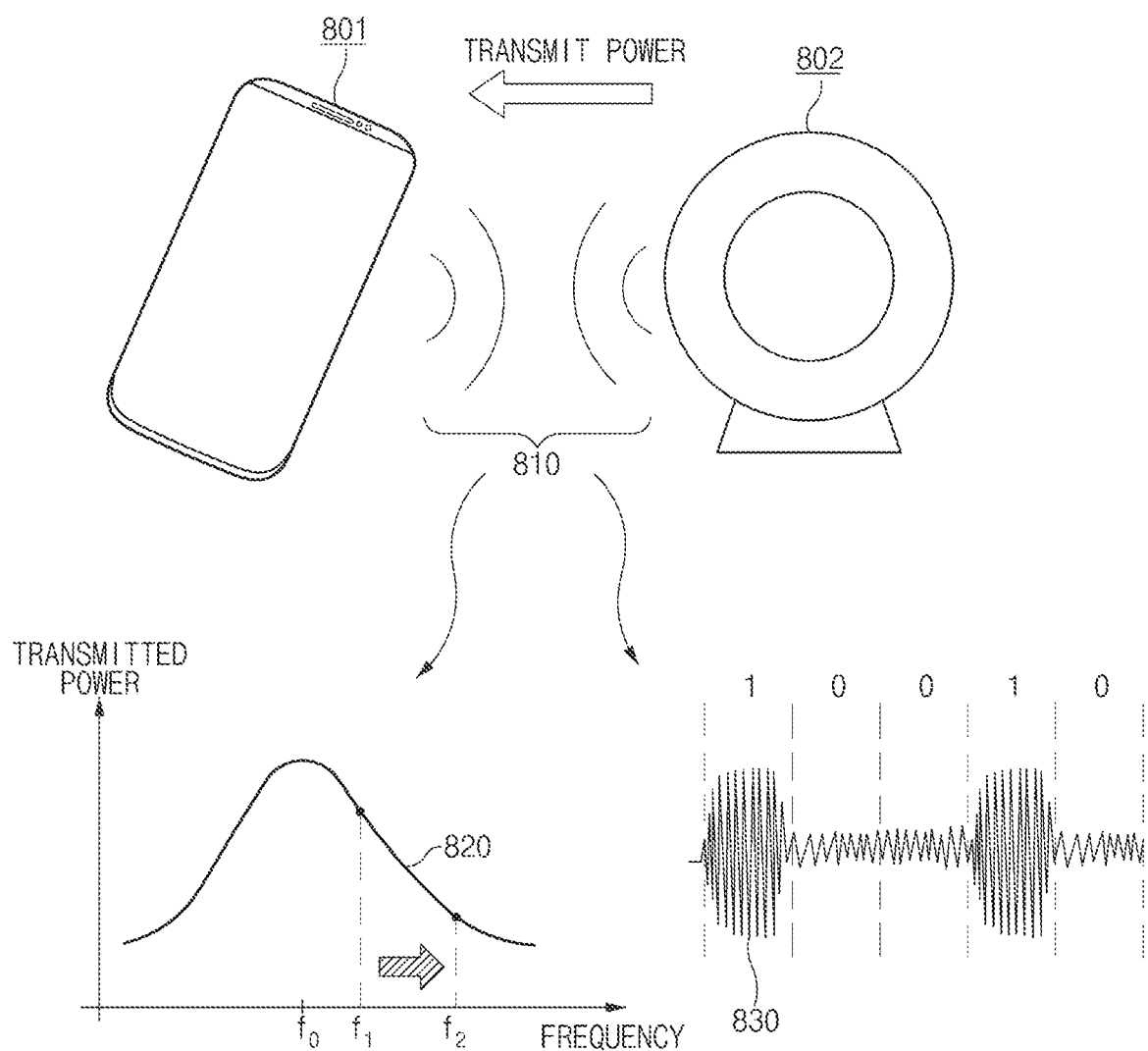
FIG. 8 is a view for explaining power transmission between an electronic device and a wireless charger, according to an embodiment of the disclosure.

FIG. 8 is a view for explaining power transmission between an electronic device and a wireless charger, according to an embodiment of the disclosure.

Referring to FIG. 8, an electronic device 801 may be magnetically inductively coupled with a wireless charger 802 (see reference numeral 810). The electronic device 801 may receive power wirelessly transmitted from the wireless charger 802, or may communicate with the wireless charger 802, through the inductively coupled magnetic field 810. However, the inductively coupled magnetic field 810 and current induced from the magnetic field 810 may cause a malfunction in a fingerprint sensor of the electronic device 801.

Accordingly, the electronic device 801, according to an embodiment of the disclosure, may hold receipt of wireless power from the wireless charger 802, or may raise the transmission frequency of the wireless power, in response to a specified event for fingerprint detection.

According to an embodiment, the amount of power transmitted from the wireless charger 802 to the electronic device 801 may be affected by frequency. For example, referring to a graph 820 depicting the amount of transmitted power, the transmitted power may be relatively low in the case where wireless charging is performed at a frequency of f2 and may be relatively high in the case where wireless charging is performed at a frequency of f1 lower than f2. For example, the electronic device 801 may set the charging frequency to f2 when receiving power from the wireless charger 802 in a low-speed charging mode and may set the charging frequency to f1 when receiving power in a high-speed charging mode.

In the case of complying with the wireless power consortium (WPC) standard, the electronic device 801 may use a charging frequency of 100 kHz to 200 kHz. For example, the electronic device 801 being wirelessly charged at a frequency of 150 kHz may raise the transmission frequency (e.g., 180 kHz) of power received from the wireless charger 802, in response to a specified event for fingerprint detection.

The adjustment of the wireless charging frequency may be implemented by transmitting an instruction message for raising/lowering the charging frequency to the wireless charger 802 through in-band communication by the electronic device 801. For example, referring to a graph 830 depicting the intensity of the inductively coupled magnetic field 810, the intensity of the magnetic field 810 higher than a specified value may correspond to "1", and the intensity of the magnetic field 810 lower than the specified value may correspond to "0". The electronic device 801 may control the intensity of the magnetic field 810 by modulating a load of a wireless charger module. The electronic device 801 and the wireless charger 802 may communicate with each other on the basis of the in-band communication.

Figure 9:
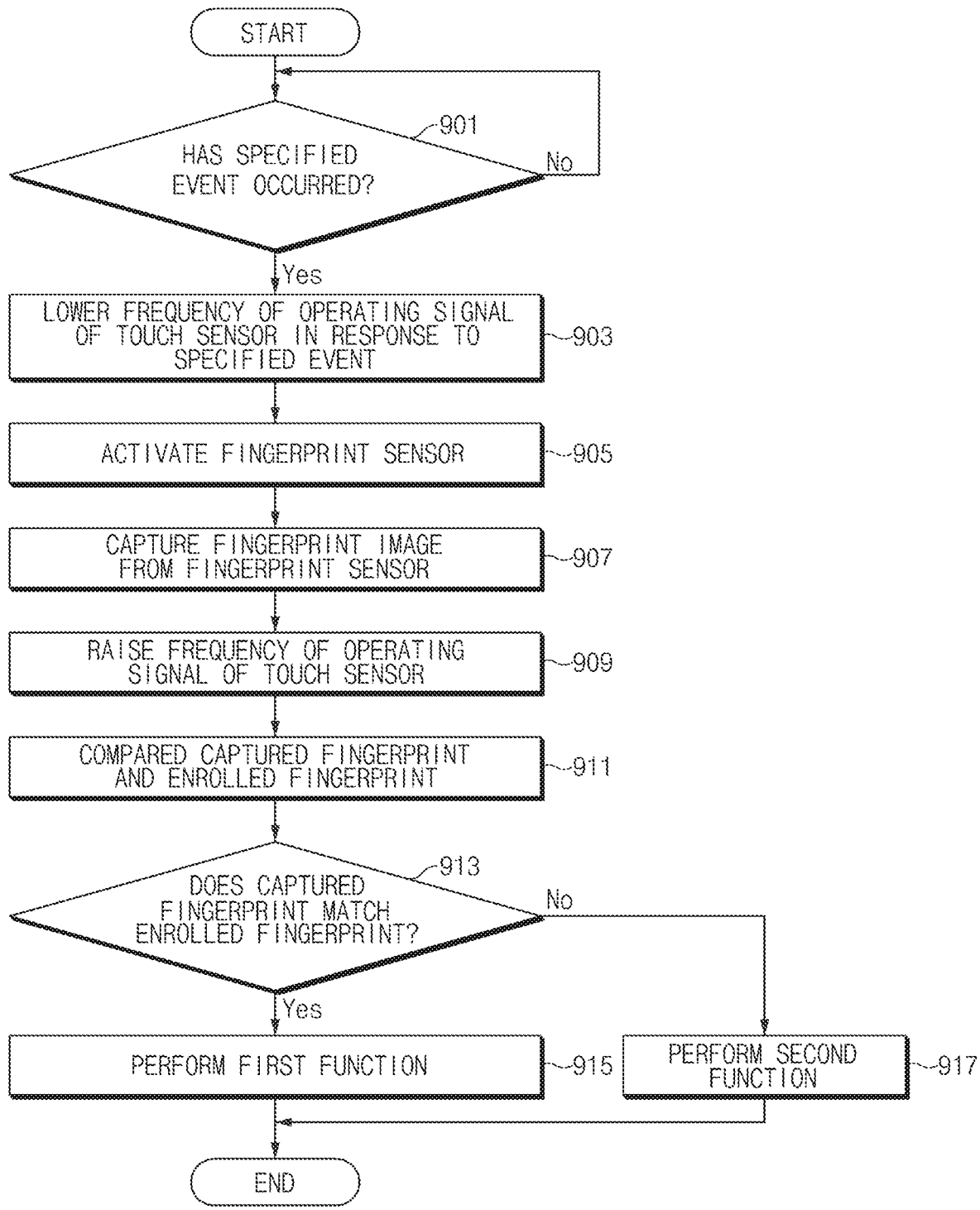
FIG. 9 is a flowchart illustrating a fingerprint detection method according to an embodiment of the disclosure.

FIG. 9 is a flowchart illustrating a fingerprint detection method according to an embodiment of the disclosure.

Referring to FIG. 9, a fingerprint detection method according to an embodiment may include operations 901 to 917. Operations 901 to 917 may be performed by, for example, the electronic device 501 illustrated in FIG. 5. Operations 901 to 917 may be implemented with, for example, instructions performed (or executed) by the processor 570 of the electronic device 501. The instructions may be stored in, for example, a computer-readable storage medium or the memory 560 of the electronic device 501 illustrated in FIG. 5. The reference numerals of FIG. 5 will be used in the following description of operations 901 to 917.

In operation 901, the processor 570 of the electronic device 501 may determine whether a specified event has occurred. The processor 570 may proceed to operation 903 when it is determined that the specified event has occurred, or may repeat operation 901 if not. For example, the specified event may include displaying of a specified UI screen on the display panel 510. The specified UI screen may be a screen requiring a user's fingerprint authentication. In another example, the specified event may include detection of the user's touch by the touch sensor 520.

In operation 903, the processor 570 may lower the frequency of an operating signal of the touch sensor 520 in response to the specified event. Additionally or alternatively, in response to the specified event, the processor 570 may hold an operation of the touch sensor 520, may lower the duty cycle of the operating signal, or may lower the intensity of the operating signal.

According to various embodiments, the touch sensor 520 may be a capacitive touch sensor that supports both a mutual capacitance method and a self-capacitance method. In this case, the processor 570 may, in operation 903, change an operating method of the touch sensor 520 from a mutual capacitance method to a self-capacitance method.

According to various embodiments, in operation 903, the processor 570 may hold receipt of wireless power from the wireless charger 502, or may control the wireless charger module 552 to raise the transmission frequency of the wireless power.

In operation 905, the processor 570 may activate the fingerprint sensor 530. For example, the processor 570 may wake up the fingerprint sensor IC 535 to activate the fingerprint sensor 530.

In operation 907, the processor 570 may capture the user's fingerprint image by using the fingerprint sensor 530. According to an embodiment, the processor 570 may capture the user's fingerprint image by using the fingerprint sensor 530 for a period of time during which the operating signal of the touch sensor 520 is logical low.

In operation 909, the processor 570 may raise the frequency of the operating signal of the touch sensor 520, which has been lowered in operation 903, to the original level. The frequency rise is an example, and according to various embodiments, the processor 570 may return the touch sensor 520 or the wireless charger module 552 to the original state prior to operation 903.

In operation 911, the processor 570 may compare a fingerprint corresponding to the fingerprint image captured in operation 907 and an enrolled fingerprint stored in the memory 560.

In operation 913, the processor 570 may determine whether the captured fingerprint matches the enrolled fingerprint, based on the comparison result in operation 911. When it is determined that the captured fingerprint matches the enrolled fingerprint, that is, when user authentication succeeds, the processor 570 may proceed to operation 915, and if not, the processor 570 may proceed to operation 917.

In operation 915, the processor 570 may perform a first function requiring user authentication since the captured fingerprint matches the enrolled fingerprint. For example, the first function may include an operation of outputting a home screen on the display panel 510 by the processor 570.

In operation 917, the processor 570 may perform a second function, which is performed in the case of a failure in user authentication, since the captured fingerprint does not match the enrolled fingerprint. For example, the second function may include an operation of outputting, on the display panel 510, a message for requesting the user's fingerprint again or a message for informing of a change to personal identification number (PIN) authentication.

According to various embodiments of the disclosure, in response to an event for starting fingerprint detection, an operating method of a touch sensor or a wireless charger module may be changed to detect a high-reliable fingerprint image.

An electronic device according to an embodiment of the disclosure may include a display panel, a touch sensor for sensing an input from a user, a biometric sensor, and a processor. The processor may receive the input through the biometric sensor, and while the input is being received through the biometric sensor, the processor may discard a sensed signal from the touch sensor and may obtain biometric information corresponding to the input through the biometric sensor.

According to an embodiment, the biometric sensor may be disposed below the display panel or may be included in the display panel.

According to an embodiment, the biometric sensor may be an ultrasonic fingerprint sensor that includes an ultrasonic transmitter and an ultrasonic receiver. At least one of the ultrasonic transmitter or the ultrasonic receiver may be included in the display panel.

An electronic device according to an embodiment of the disclosure may include a display panel for displaying a first frame and a second frame subsequent to the first frame, a touch sensor for sensing an input from a user for a first specified interval falling within an interval between the first frame and the second frame, a biometric sensor for detecting biometric information for a second specified interval falling within the interval between the first frame and the second frame and not overlapping the first specified interval, and a processor. The processor may sense the input for the first specified interval through the touch sensor and may obtain biometric information corresponding to the input for the second specified interval through the biometric sensor.

According to an embodiment, the processor may sense the input for the first specified interval and a third specified interval including at least a portion of the second specified interval through the touch sensor in a case where the biometric information is not present.

According to an embodiment, in a case where the biometric sensor is requested to be activated, the processor may adjust the first specified interval and may obtain the biometric information through the biometric sensor for an interval not overlapping the adjusted first specified interval.

According to an embodiment, the activation of the biometric sensor may include displaying of a specified UI screen or execution of a specified application.

According to an embodiment, the adjustment of the first specified interval may be made by an operation of lowering a duty cycle of a signal used by the touch sensor to sense the input.

According to an embodiment, the adjustment of the first specified interval may be made by an operation of lowering an operating frequency of a signal used by the touch sensor to sense the input.

An electronic device according to an embodiment of the disclosure may include a display including a touch sensor and a display panel, a fingerprint sensor included in the display or disposed on a rear surface of the display, and a processor electrically connected with the display and the fingerprint sensor. The processor may hold an operation of the touch sensor or may lower a frequency of an operating signal of the touch sensor in response to a specified event, may activate the fingerprint sensor, and may capture a fingerprint image from the fingerprint sensor.

According to an embodiment, the processor may raise the frequency of the operating signal of the touch sensor when the fingerprint image is captured.

According to an embodiment, the specified event may include displaying of a specified UI screen on the display panel.

According to an embodiment, the specified event may include detection of a user's touch by the touch sensor.

According to an embodiment, the touch may be detected from a region, which corresponds to a fingerprint detection area of the fingerprint sensor, of a touch detection area of the touch sensor.

According to an embodiment, the fingerprint sensor may capture the fingerprint image for a period of time during which the operating signal of the touch sensor is logical low.

According to an embodiment, the processor may lower a duty cycle of the operating signal of the touch sensor.

According to an embodiment, the processor may lower an intensity of the operating signal of the touch sensor.

According to an embodiment, the touch sensor may be a capacitive touch sensor that supports a mutual capacitance method and a self-capacitance method. The processor may change an operating method of the touch sensor from the mutual capacitance method to the self-capacitance method in response to the specified event.

According to an embodiment, the electronic device may further include a wireless charger module inductively coupled with a charger and receiving power wirelessly transmitted from the charger. The processor may control the wireless charger module to hold the receipt of the power from the charger or to raise a transmission frequency of the power in response to the specified event.

According to an embodiment, the fingerprint sensor may include an ultrasonic fingerprint sensor.

A fingerprint detection method of an electronic device according to an embodiment of the disclosure may include lowering a frequency of an operating signal of a touch sensor in response to a specified event, activating a fingerprint sensor, and capturing a fingerprint image from the fingerprint sensor.

According to an embodiment, the fingerprint detection method may further include raising the frequency of the operating signal of the touch sensor when the fingerprint image is captured.

According to an embodiment, the specified event may include displaying of a specified UI screen on the display panel.

According to an embodiment, the specified event may include detection of a user's touch by the touch sensor.

According to an embodiment, the capturing of the fingerprint image from the fingerprint sensor may be performed for a period of time during which the operating signal of the touch sensor is logical low.

According to an embodiment, the fingerprint detection method may further include lowering a duty cycle of the operating signal of the touch sensor.

According to an embodiment, the fingerprint detection method may further include lowering an intensity of the operating signal of the touch sensor.

According to an embodiment, the touch sensor may be a capacitive touch sensor that supports a mutual capacitance method and a self-capacitance method. The fingerprint detection method may further include changing an operating method of the touch sensor from the mutual capacitance method to the self-capacitance method in response to the specified event.

According to an embodiment, the fingerprint detection method may further include holding receipt of power wirelessly transmitted from an inductively coupled charger or raising a transmission frequency of the power in response to the specified event.

The term "module" used in this disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 570), may cause the one or more processors to perform a function corresponding to the instruction. The computer-readable storage media, for example, may be the memory 560.

A computer-readable recording medium may include a hard disk, a floppy disk, a magnetic media (e.g., a magnetic tape), an optical media (e.g., a compact disc read only memory (CD-ROM) and a DVD, a magneto-optical media (e.g., a floptical disk)), and hardware devices (e.g., a ROM, a random-access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation according to various embodiments, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a display panel;
   a touch sensor configured to sense an input from a user;
   a biometric sensor; and
   at least one processor configured to:
      receive the input through the biometric sensor, and
      discard a sensed signal from the touch sensor and obtain biometric information corresponding to the input through the biometric sensor while the input is being received through the biometric sensor.

2. The electronic device of claim 1, wherein the biometric sensor is disposed below the display panel or included in the display panel.

3. The electronic device of claim 1,
   wherein the biometric sensor comprises an ultrasonic fingerprint sensor that includes an ultrasonic transmitter and an ultrasonic receiver, and
   wherein at least one of the ultrasonic transmitter or the ultrasonic receiver is included in the display panel.

4. An electronic device comprising:
a display panel;
a touch sensor;
a biometric sensor; and
at least one processor configured to:
- display a first frame and a second frame subsequent to the first frame,
- sense, using the touch sensor, an input from a user for a first specified interval falling within an interval between the first frame and the second frame,
- adjust the first specified interval by lowering a duty cycle of a driving signal for the touch sensor in response to a specified event for requesting biometric authentication, and
- detect, using the biometric sensor, biometric information for a second specified interval falling within the interval, not overlapping the adjusted first specified interval.

5. The electronic device of claim 4, wherein the at least one processor is further configured to sense the input for the first specified interval and a third specified interval including at least a portion of the second specified interval through the touch sensor in a case where the biometric information is not detected.

6. The electronic device of claim 4, wherein the activation of the biometric sensor includes displaying of a specified user interface (UI) or execution of a specified application.

7. The electronic device of claim 4, wherein the adjustment of the first specified interval comprises lowering an operating frequency of a signal used by the touch sensor to sense the input.

8. An electronic device comprising:
a display including a touch sensor and a display panel;
a fingerprint sensor included in the display or disposed on a rear surface of the display; and
at least one processor electrically connected with the display and the fingerprint sensor,
wherein the at least one processor is configured to:
- in response to detecting a touch, lower a frequency of an operating signal of the touch sensor and activate the fingerprint sensor, and
- capture a fingerprint image from the fingerprint sensor.

9. The electronic device of claim 8, wherein the at least one processor is further configured to raise the frequency of the operating signal of the touch sensor when the fingerprint image is captured.

10. The electronic device of claim 8, wherein the touch is detected in a fingerprint detection area of the fingerprint sensor or a touch detection area of the touch sensor.

11. The electronic device of claim 8, wherein the at least one processor is further configured to capture the fingerprint image by using the fingerprint sensor for a period of time during which the operating signal of the touch sensor is logical low.

12. The electronic device of claim 8, wherein the at least one processor is further configured to lower a duty cycle of the operating signal of the touch sensor.

13. The electronic device of claim 8, wherein the at least one processor is further configured to lower an intensity of the operating signal of the touch sensor.

14. The electronic device of claim 8,
wherein the touch sensor comprises a capacitive touch sensor that supports a mutual capacitance method and a self-capacitance method, and
wherein the at least one processor is further configured to, in response to detecting the touch, change an operating method of the touch sensor from the mutual capacitance method to the self-capacitance method.

15. The electronic device of claim 8, further comprising:
a wireless charger module inductively coupled with a charger and configured to receive power wirelessly transmitted from the charger,
wherein the at least one processor is further configured to control the wireless charger module to omit the receipt of the power from the charger or raise a transmission frequency of the power in response to a specified event.

16. The electronic device of claim 8, wherein the fingerprint sensor includes an ultrasonic fingerprint sensor.

* * * * *